(12) United States Patent
Nelson Deurmier et al.

(10) Patent No.: US 8,484,109 B1
(45) Date of Patent: Jul. 9, 2013

(54) SYSTEMS AND METHODS FOR IMPROVED FINANCIAL CALCULATORS

(75) Inventors: Jill Marie Nelson Deurmier, San Antonio, TX (US); Richard Scott Graschel, San Antonio, TX (US); John Xavier Felan, Helotes, TX (US); Christina Nicole Laquey, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/862,652

(22) Filed: Sep. 27, 2007

(51) Int. Cl.
*G06Q 40/00* (2012.01)
(52) U.S. Cl.
USPC .......................................................... 705/35
(58) Field of Classification Search
USPC ................ 705/4, 25, 38; 434/307 R
See application file for complete search history.

(56) References Cited

U.S. PATENT DOCUMENTS

| | | | |
|---|---|---|---|
| 6,012,043 A | 1/2000 | Albright | |
| 6,430,542 B1 | 8/2002 | Moran | 705/36 |
| 6,985,880 B1 | 1/2006 | Hodgdon | 705/36 |
| 7,062,462 B1* | 6/2006 | Ireland et al. | 705/38 |
| 2002/0194098 A1 | 12/2002 | Stiff et al. | |
| 2004/0236652 A1* | 11/2004 | Heiges et al. | 705/35 |
| 2005/0171820 A1* | 8/2005 | Snyder | 705/4 |
| 2005/0214729 A1* | 9/2005 | Greenly et al. | 434/307 R |
| 2006/0122924 A1 | 6/2006 | Brustkern et al. | |
| 2007/0250417 A1 | 10/2007 | Lane | |
| 2008/0071673 A1* | 3/2008 | Howard et al. | 705/38 |
| 2008/0201269 A1 | 8/2008 | Hollins et al. | |

OTHER PUBLICATIONS

Wells Fargo, wellsfargo.com/help/tools, Mar. 19, 2006.*

* cited by examiner

*Primary Examiner* — Samica L Norman
(74) *Attorney, Agent, or Firm* — Kilpatrick Townsend & Stockton LLP

(57) ABSTRACT

In various embodiments, financial calculators with improved data security and data integration, collecting, managing and sharing data generated by a user are described. Selected financial data is accessed and shared with various financial tools in a centralized data store to provide a faster, easier calculator with fewer inputs. In one embodiment, a retirement calculator advises a user on how much to save in a corporate retirement plan, IRA and other investments, and the priority order in which to save. In another embodiment, a college savings calculator is disclosed that pre-fills anticipated college costs when a user selects a college.

21 Claims, 9 Drawing Sheets

SYSTEMS AND METHODS FOR IMPROVED FINANCIAL CALCULATORS

CROSS-REFERENCES

The subject matter described in this application is related to subject matter disclosed in the following commonly assigned applications: U.S. patent application Ser. No. 11/862,622, filed on even date herewith, entitled "Systems and Methods for Improved Financial Calculators"; and U.S. patent application Ser. No. 11/862,671, filed on even date herewith, entitled "Systems and Methods for Improved Financial Calculators." The contents of each of the above-referenced U.S. patent applications are herein incorporated by reference in their entirety.

The subject matter described in this application is also related to subject matter disclosed in the following commonly assigned applications: U.S. patent application Ser. No. 11/486,876, filed Jul. 13, 2006, entitled "Systems And Methods For Sharing Data From Web Accessed Calculators"; and U.S. patent application Ser. No. 11/487,037, filed Jul. 13, 2006, entitled "Systems And Methods For Sharing Data From Web Accessed Calculators." The contents of each of the above-referenced U.S. patent applications are herein incorporated by reference in their entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, USAA.

BACKGROUND

One way that businesses provide value to customers in a website is to provide them with tools that the customer can use in solving a particular problem associated with goods or services provided through a web site. Web sites operated by financial services companies offer a wide variety of calculators for their customers. For example, loan calculators with amortization schedules may be provided by some companies. These calculators may vary with regard to their inputs, but many will have windows to input a principal amount, the number of months within which to pay the loan, an interest rate, the payment schedule, and a total amount paid for life of the loan. Among other common calculators are savings and investment calculators, retirement calculators, 401(k) calculators, etc. More complex calculators may be used to develop financial plans that take into account the assets, liabilities, debts, and expenses of an individual.

Among the many tools provided are calculators that assist the customer in planning for significant life events such as retirement or financing their children through college. For example, in a web site for a business that provides financial services, the web site may provide calculators on a web page that make it easy for customers to plan for their needs. If the customer is interested in college savings, the institution may provide a college savings calculator where the customer can input a time frame, geographic region and type of college, and the calculator will determine the amount of money that the customer would need to save. Similarly, if the customer is interested in retirement savings, a calculator may be provided where the customer can input their current age and desired retirement age, and the calculator will determine the amount of savings required.

A disadvantage shared by sites that provide web pages with calculators is that data entered by the customer is not saved for future use by the customer and the business. Another disadvantage of the way calculators have been implemented in many sites is that data entered into one calculator cannot be shared with another calculator that may use the same data. Furthermore, an institution may have much of the information that must be input into the calculators, in particular if the customer has an existing relationship with the business providing the website. For example, a banking institution may provide a retirement calculator for its customers, and the institution may already have access to much of the information required for input. However, such websites are typically provided by third parties and are not integrated with the institution's databases, thus requiring the customer to enter information that the institution already has in its possession. Consequently, as customers use multiple tools and calculators, the same questions are asked multiple times. Finally, lack of integration with other services and systems prevents institutions from providing more comprehensive services.

Another disadvantage of existing financial calculators is their relative lack of detail in the recommendations provided. For example, an Individual Retirement Account (IRA) Analyzer may only give advice between saving in a Roth IRA or a Traditional IRA. Typically, a user needs more detailed information to adequately plan for significant life events. Similarly, most college calculators only provide general financial guidance and do not account for specific colleges and universities even though such data is readily available.

What are needed are systems and methods that address the shortcomings described above.

SUMMARY

In various embodiments of the present disclosure, financial calculators with improved data security and data integration, as well as improved methods for collecting, managing and sharing data generated by a user are described. In certain embodiments, selected financial data is accessed and shared with various financial tools in a centralized data store to provide a faster and more efficient calculator with fewer inputs. In one such method, the financial data is shared among a plurality of calculators by creating a common data store that is used to save and search for data values generated by a user through their use of any number of calculators.

In one embodiment, a Where to Save for Retirement Calculator will advise users on how much to save in various retirement plans such as a corporate retirement plan, IRA and other investments. Furthermore, the tool may provide a prioritized list of such plans so that the user may consider the various alternatives and their respective advantages. In the Where to Save for Retirement Calculator, the user is provided advice on how to allocate their money in the various retirement/savings plans and an order which to make contributions. In another embodiment, a College Savings Calculator is disclosed that pre-fills anticipated college costs when the user selects a college.

Such comprehensive and responsive products will enable institutions offering financial and other services to provide more value to their users. For example, for existing users, financial calculators are made more convenient by pre-filling user information on record. This includes the financial data that has been identified to be shared among the various tools offered by the financial service institution. The results may give a user specific advice based on the user's financial situation, rather than general information on education or retirement investments. A methodology is also provided for managing and sharing data generated by a user using a financial calculator on the web page. The institution providing such calculators may expect higher web page utilization rates and higher rates of users completing the various forms, which in turn may lead to more financial products being purchased. Finally, integration of the financial calculators with the institution's internal customer data will enable greater data integrity and security since personal data does not have to be shared between parties.

The systems and methods disclosed reduce the amount of customer time required to complete calculations from multiple calculators. Additionally, the systems and methods disclosed will facilitate customer needs and reduce the amount of input required to assess the needs of a customer.

It can be appreciated by one of skill in the art that one or more various aspects of the disclosure may include, but are not limited to, circuitry and/or programming for effecting the herein-referenced aspects; the circuitry and/or programming can be virtually any combination of hardware, software, and/or firmware configured to effect the herein-referenced aspects, depending upon the design choices of the system designer. In addition to the foregoing, other aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings:

FIG. 5 illustrates an exemplary web page implementing a college savings calculator.

Figure 6:
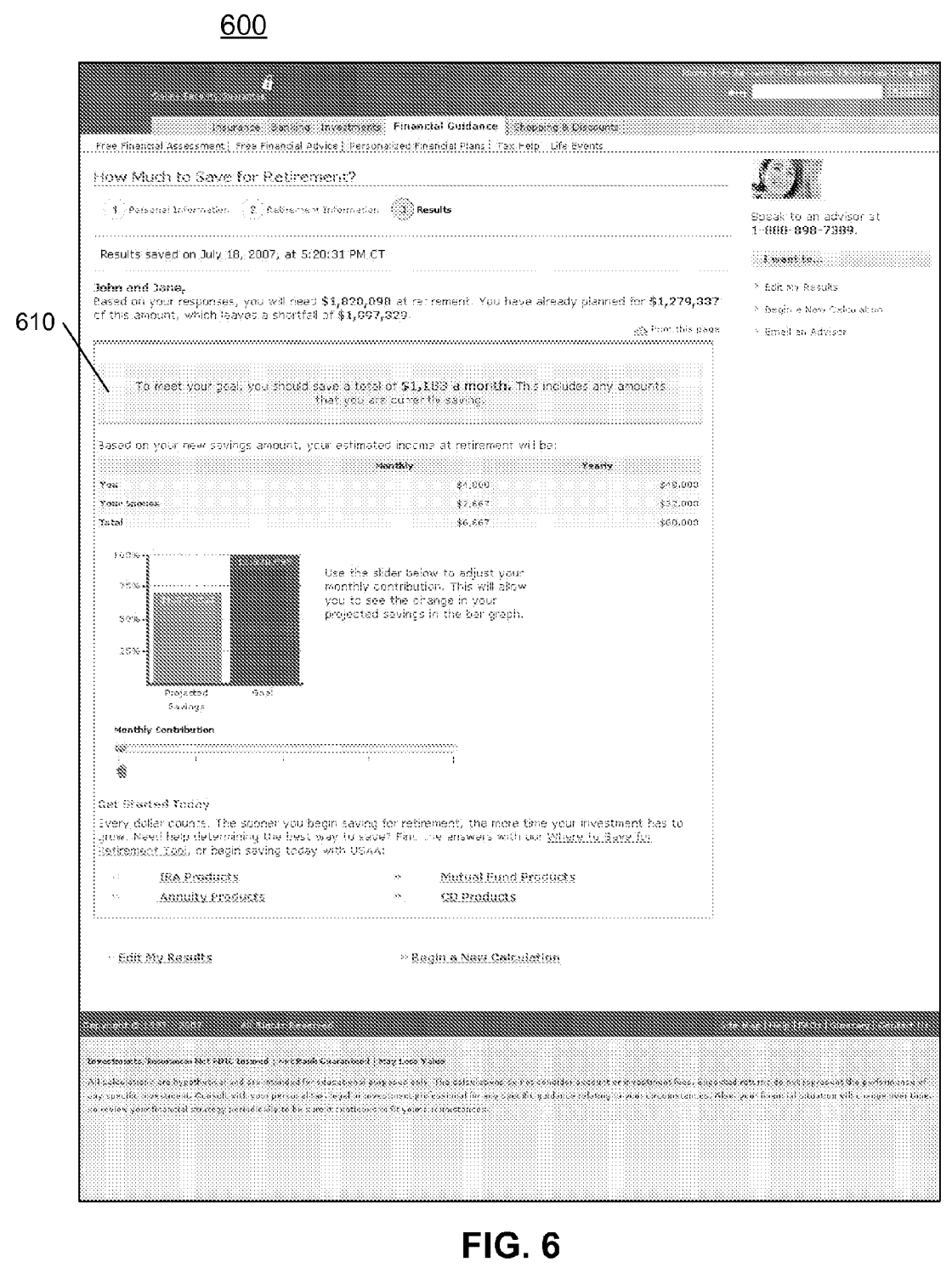

FIG. 6 illustrates an exemplary web page implementing a retirement savings calculator.

DETAILED DESCRIPTION OF ILLUSTRATIVE EMBODIMENTS

Example Computing Devices and Environment

Figure 1:
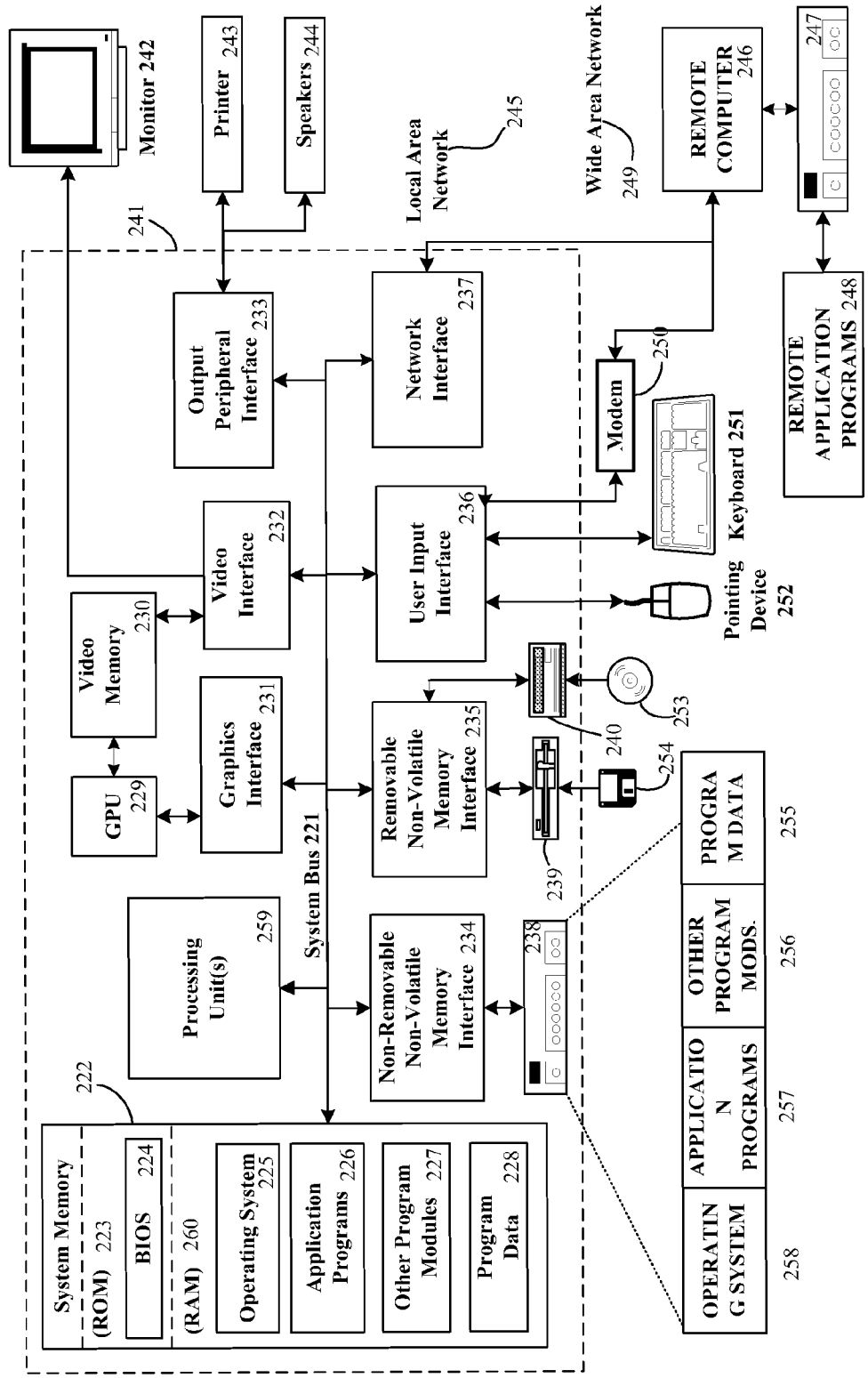
FIGS. 1 and 2 are diagrams illustrating example systems in which aspects of the described embodiments may be incorporated.

Referring to FIG. 1, shown is a block diagram representing an exemplary computing device suitable for use in conjunction with providing a system for providing financial calculators. For example, the computer executable instructions that carry out processes and methods to provide a financial calculator may reside and/or be executed in such a computing environment as shown in FIG. 1. The computing system environment 220 is only one example of a suitable computing environment and is not intended to suggest any limitation as to the scope of use or functionality of the disclosed technology. Neither should the computing system environment 220 be interpreted as having any dependency or requirement relating to any one or combination of components illustrated in the exemplary computing system environment 220.

Aspects of the disclosed technology are operational with numerous other general purpose or special purpose computing system environments or configurations. Examples of well known computing systems, environments, and/or configurations that may be suitable for use with the disclosed technology include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the disclosed technology may be implemented in the general context of computer-executable instructions, such as program modules, being executed by a computer. Generally, program modules include routines, programs, objects, components, data structures, etc. that perform particular tasks or implement particular abstract data types. Aspects of the disclosed technology may also be practiced in distributed computing environments where tasks are performed by remote processing devices that are linked through a communications network. In a distributed computing environment, program modules may be located in both local and remote computer storage media including memory storage devices.

An exemplary system for implementing aspects of the disclosed technology includes a general purpose computing device in the form of a computer 241. Components of computer 241 may include, but are not limited to, a processing unit 259, a system memory 222, and a system bus 221 that couples various system components, including the system memory, to the processing unit 259. The system bus 221 may be any of several types of bus structures including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, as well as its successor, PCI-Express standard. In some embodiments, the exemplary system may additionally include a graphics interface 231 that renders graphics, video memory 230 that can be used to cache graphics, and a GPU 229 that executes the instructions to render graphics.

Computer 241 typically includes a variety of computer readable media. Computer readable media can be any available media that can be accessed by computer 241 and includes both volatile and nonvolatile media, removable and non-removable media. By way of example and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 241. Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, long and short range radio frequency (RF), infrared, and other wireless media. Combinations of any of the above are also included within the scope of computer readable media.

The system memory 222 includes computer storage media in the form of volatile and/or nonvolatile memory such as read only memory (ROM) 223 and random access memory (RAM) 260. A basic input/output system (BIOS) 224, containing the basic routines that help to transfer information between elements within computer 241, such as during startup, is typically stored in ROM 223. RAM 260 typically contains data and/or program modules that are immediately accessible to and/or presently being operated on by processing unit 259. By way of example and not limitation, FIG. 1 illustrates operating system 225, application programs 226, other program modules 227, and program data 228.

The computer 241 may also include other removable/non-removable, volatile/nonvolatile computer storage media. By way of example, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable non-volatile memory interface such as interface 234, and magnetic disk drive 239 and optical disk drive 240 are typically connected to the system bus 221 by a removable non-volatile memory interface, such as interface 235.

The drives and their associated computer storage media discussed above, and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can be either the same as or different from operating system 225, application programs 226, other program modules 227, and program data 228. Operating system 258, application programs 257, other program modules 256, and program data 255 are given different numbers here to illustrate that, at a minimum, they are different copies.

A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. An exemplary secure video standard would be the High-Definition Multimedia Interface (HDMI) standard. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246 The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236 or other appropriate mechanism. In a networked environment, program modules depicted relative to the computer 241, or portions thereof, may be stored in the remote memory storage device. By way of example and not limitation, FIG. 1 illustrates remote application programs 248 as residing on memory storage device 247. It will be appreciated that the network connections shown are exemplary and that other means of establishing a communications link between the computers 241 and 246 may be used.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the disclosed technology, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the disclosure in the context of one or more stand-alone computer systems, the disclosure is not so limited, but rather may be implemented in connection with any computing environment, such as a network or distributed computing environment. Still further, aspects of the disclosure may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
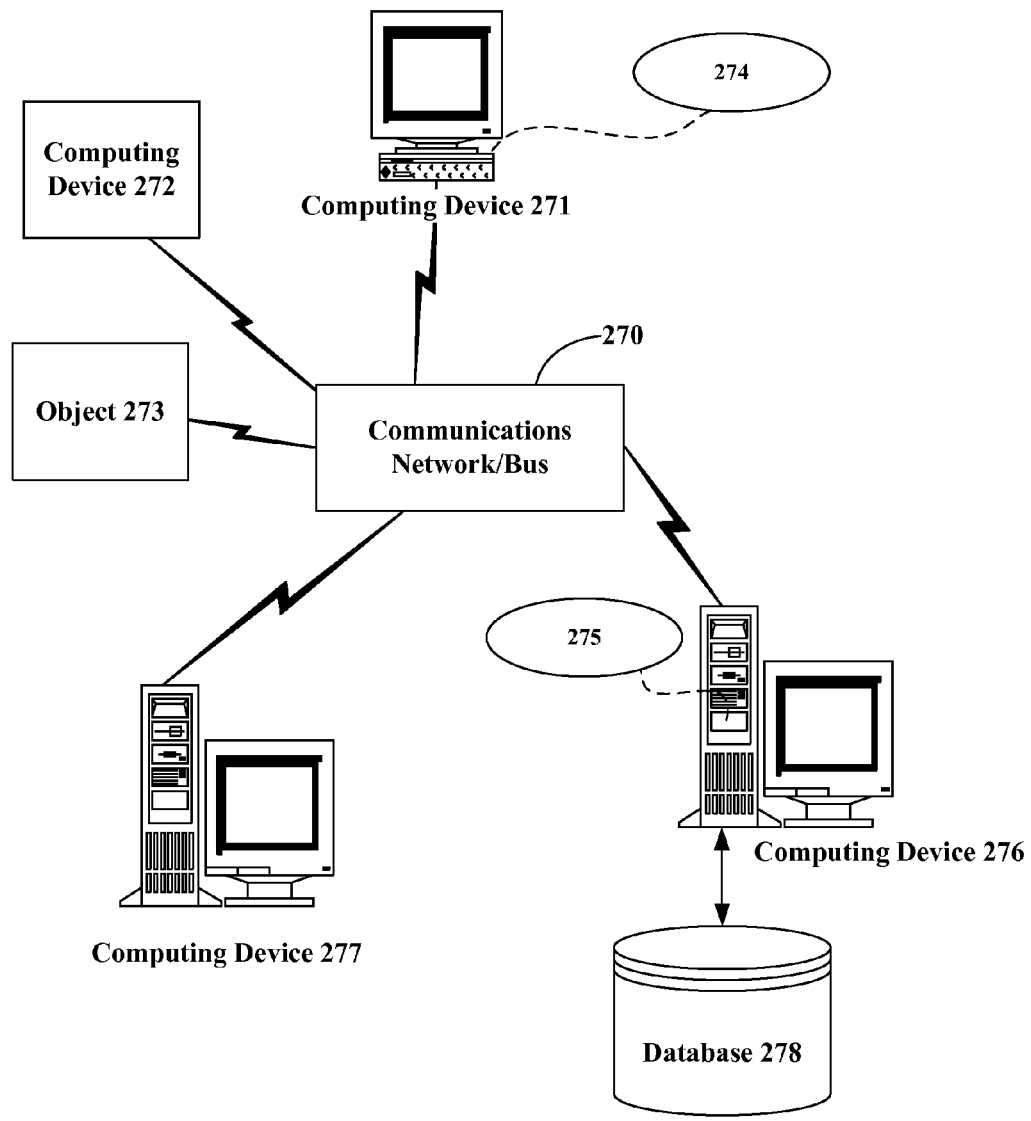

Referring next to FIG. 2, shown is an exemplary networked computing environment of which a financial calculator may be a part. For example, object 273 may represent a computer as one of the various clients on the network of FIG. 2 using and/or implementing systems that provide the means of communication between various clients and servers on the network. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as Personal Digital Assistants (PDAs), audio/video devices, music players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the disclosure, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a user of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the disclosure should not be limited to any single embodiment, but rather should be construed in breadth and scope in accordance with the appended claims.

College Savings Calculator

A number of programs are available for facilitating savings for college costs. For example, 529 college savings programs allow individuals to save money for college through state-sponsored investment accounts. A 529 plan is a state-operated investment plan that gives families a tax-free way to save money for college. Authorized by Congress in 1996, they are officially known as qualified tuition programs (QTPs), but are commonly referred to as "529 plans," "state 529 plans," or "section 529 plans" after the section of the IRS code that provides the plans' special tax breaks.

Prepaid college tuition plans, also known as Prepaid Education Arrangements (PEAs), allow families to buy all or part of a public in-state education at present-day prices. The value of the investment is guaranteed by the state to meet or exceed annual in-state public college tuition inflation. State 529 Prepaid Tuition Programs allow users to lock into the tuition price being charged at the state's public universities in the year when they enroll in the program. Earnings are typically guaranteed by the state to match in-state public tuition inflation.

A college savings plan may offer other options as well. College savings plans, also known as Education Savings Accounts (ESAs), are state-managed investment accounts, whose funds can be used for "qualified education expenses" such as tuition, fees, room and board, books, and supplies. Earnings and withdrawals are tax-free—some states will also waive state taxes or let parents deduct a portion of the contributions.

Users may also use Roth IRAs, and may withdraw contributions to a Roth IRA to pay for college expenses without having to pay either income tax or the typical ten percent early withdrawal penalty. Investment earnings in a Roth IRA are also available for withdrawal without the ten percent penalty, but subject to regular income tax.

Various types of savings calculators have been offered to consumers to help them navigate through the various available options. A flat contribution calculator shows the consumer how much money they must contribute each month to an interest-bearing bank account or investment fund in order to reach their savings goals. Instead of calculating a fixed dollar amount to save per period, it calculates a percentage of gross income. Consumers who desire to analyze the effectiveness of their current savings plan may use a savings growth projection calculator to calculate the growth potential of their current contributions.

Figure 3:
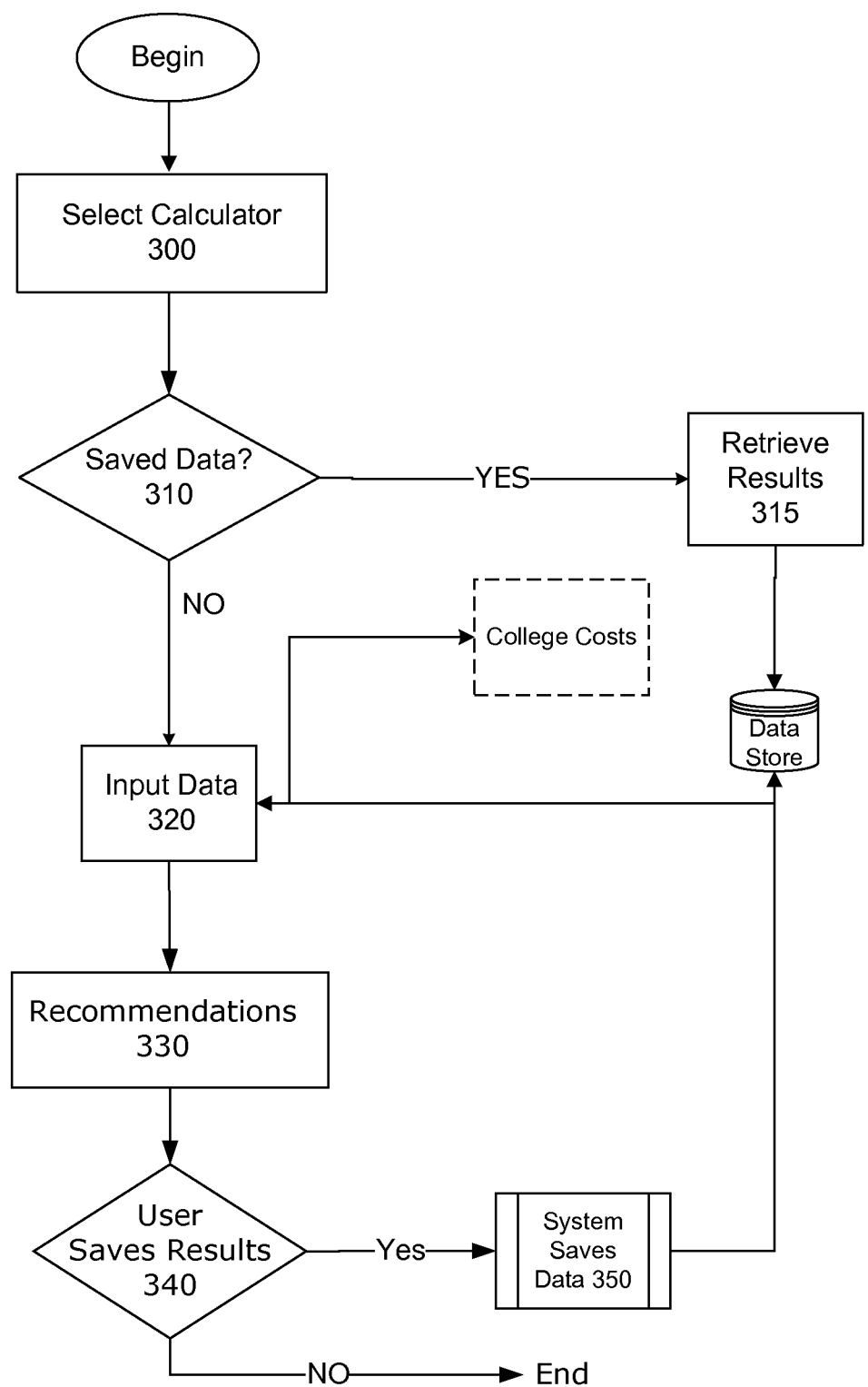
FIG. 3 illustrates an operational flow representing example operations related to providing a college savings calculator.

In one embodiment of the present disclosure, an improved education calculator is disclosed. An objective of the calculator is to answer the question, "How much will I need to save to send each student to college?" Referring to FIG. 3, a consumer may select an option to use the education planning calculator on the provider's website. The website may require the consumer to log on if the education calculator is offered in conjunction with other services that the consumer may subscribe to. The consumer then navigates to the education planning calculator. When the consumer has completed all the steps and provided the requested inputs, the education planning calculator presents an estimated monthly amount needed to save for each student along with recommendations for how to save the estimated amount.

Returning to FIG. 3, a consumer selects the option 300 to execute the education planning calculator. The calculator may display a welcome page that provides a description of what the calculator will help the consumer to accomplish. The consumer is next given the option to begin calculations. At this point, the process may request previously saved calculated results 310 from a data store. If the process determines that the consumer does not have previously saved results then the system will proceed with default values. If the system determines that the consumer does have previously saved results then the process may retrieve results 315 from the data store. The consumer may exit the calculator at any time. However, the system may not save the data if the user chooses to exit before calculating the results. If the user exits before calculating the results, the system may optionally discard the data input up to that point. If the user exits after calculating the results, then the inputs and results may be saved to the data store.

The process may further request additional data related to the consumer from a data store. If data exists, the process may, for example, return data for at least one child. If the consumer has no data on file, then the process proceeds by prompting the user to input data 320. In one embodiment, the following information may be requested:
 1. Student's first and last name
 2. Student's age
 3. The age the Student will start college
 4. The number of years the Student will attend college
 5. The annual cost (by Institution type)

The system may then present an Average Cost Result wizard prompting the user to select from the following estimated costs to calculate an annual cost:
 1. state
 2. institution name
 3. institution type
 4. base tuition
 5. books and supplies
 6. room and board
 7. in-state cost vs. out-of-state cost
 8. on-campus cost vs. off-campus cost
 9. other expenses
 10. total expenses
 11. the amount already saved per student
 12. the monthly contribution the user is currently making or would like to make towards the student's education (per student)
 13. the rate of return percentage the user is expecting to receive on education investments The user may then select an option to determine a recommendation based upon the inputs provided. The system calculates results and displays a recommendation 330 to the user. The education planning calculator typically presents a result for each child. The recommendation output may include:
 1. An estimated future cost of education
 2. An estimated shortfall amount
 3. The recommended monthly amount to save
 4. The inputs and assumptions used in calculating the results
 5. Other text and information determined by the web site provider
 6. The option to edit the current recommendation
 7. The option to begin a new recommendation
 8. The option to save the recommendation
 9. The option to print the recommendation The user may then select the option to save the results 340 and the option to print the results. If the user selects an option to save the results then the process may save the data 350 in the data store for future reference and retrieval. In some embodiments, the data store may retain the saved results for a predetermined period such as 12 months. The user may then exit the education planning calculator process.

As discussed above, the calculator may request results that have been previously saved from an earlier education planning calculator session. In one embodiment the data that may be persisted to/from the data store are:
1. Calculator Name or Identifier
2. User Name or Identifier
3. Student's First Name and Last Name (for each student)
4. Student' Age (for each student)
5. Age to start college (for each student)
6. Estimated annual cost (by Institution type) (for each student)
7. Number of years attending college (for each student)
8. Amount already saved (for each student)
9. Monthly contribution (for each student)
10. Expected rate of return percentage (for each student)
11. Institution (Name or Type)
12. Estimated shortfall amount
13. Percentage of total cost planned for already.
14. The recommended monthly amount to save (For each Student)
15. Other text/graphs determined by the website to include in the recommendation Thus, for example, the student's First Name and Last Name and the student's age may be pre-filled. The calculator may further retrieve the student's Date Of Birth and may pre-fill the Student's Age To Start College field. The calculator may pre-determine certain fields that can be estimated based on existing information. For example, the calculator may calculate a student's age by subtracting the date of birth from the current date.

During a subsequent session, the user may select an option to view a saved recommendation. The user may elect to edit the recommendation, upon which the system returns the saved inputs. If the user elects to begin a new recommendation, the system returns the user to the opening web page.

In a further embodiment, the user may select an option to obtain a recommendation for a savings plan. The system may prompt the user to select an amount that the user plans to save. Using one example scenario, the user may be asked if they plan to save more than $2000 or less than $2000 per year (per Student). If the user selects less than $2000, for example, the system may prompt the user to input a tax filing status. The system may then prompt the user to select if their Adjusted Gross Income (AGI) is less than a maximum amount specified in the tax code. If the user selects more than $2000 the system does not prompt the user for tax filing status or a selection to input if the AGI is more or less than the maximum amount specified in the tax code.

Figure 5:
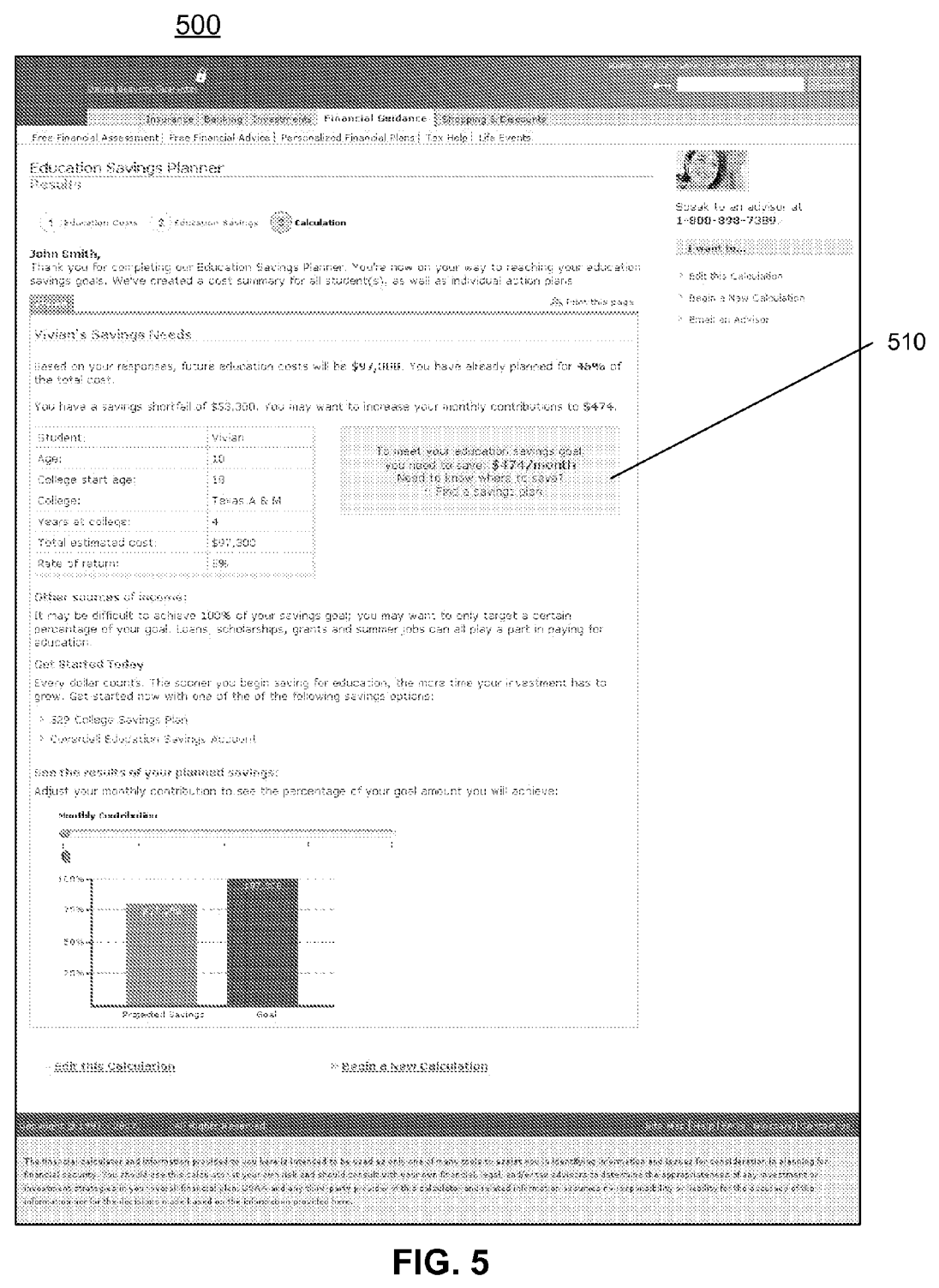

If the user selects an option to obtain a recommendation for a savings plan, the system may display a recommendation with a link to information for either a 529 College Savings Plan or a Coverdell Education Savings Account based on the user's inputs. FIG. 5 depicts an example web page 500 that may be implemented outlining some of the recommendations discussed above. Referring to the figure, area 510 provides an estimated amount to be saved in order to meet the desired goals provided by the user.

Many college savings calculators use generalized college costs based upon averages for a type of college or for a geographic region. In a further embodiment of the present disclosure, a cost database is provided that includes estimated costs for individual colleges is provided. Such as database may enable the calculator to allow the user to select a specific college (i.e., University of Washington) that the user would like to have considered in the recommendation. College costs may widely vary within geographic regions and within types of colleges, and providing such an individualized database may enable the user to receive a more accurate recommendation.

Retirement Savings Calculator

One type of savings plan is the employer-sponsored retirement plan allowing employee deferrals (401(k) plans). In such a plan, an employee's contributions are deducted from their salary as a pretax contribution (reducing their current taxable income) and any investment earnings are tax deferred until withdrawn. These plans often include employer-matching contributions which make these types of plans an effective savings plan for retirement.

Individual retirement accounts (IRAs), like employer-sponsored retirement plans, feature tax deferral of earnings. An IRA is a personal savings plan that offers specific tax benefits. Traditional IRAs may enable a consumer to lower their taxable income through deductible contributions. Roth IRAs do not permit tax-deductible contributions, but do allow the consumer to make tax-free withdrawals under certain conditions.

Another way of saving for the future is through annuities. Annuities are generally funded with after-tax dollars, but their earnings are tax-deferred. There is generally no annual limit on contributions to an annuity. A typical annuity provides income payments beginning at some future time, usually at retirement.

In one embodiment of the present disclosure, a process for providing a retirement savings amount calculator is described. An objective of the calculator is to recommend the how much the user should save in order to be able to retire and live at a desired lifestyle.

Figure 4:
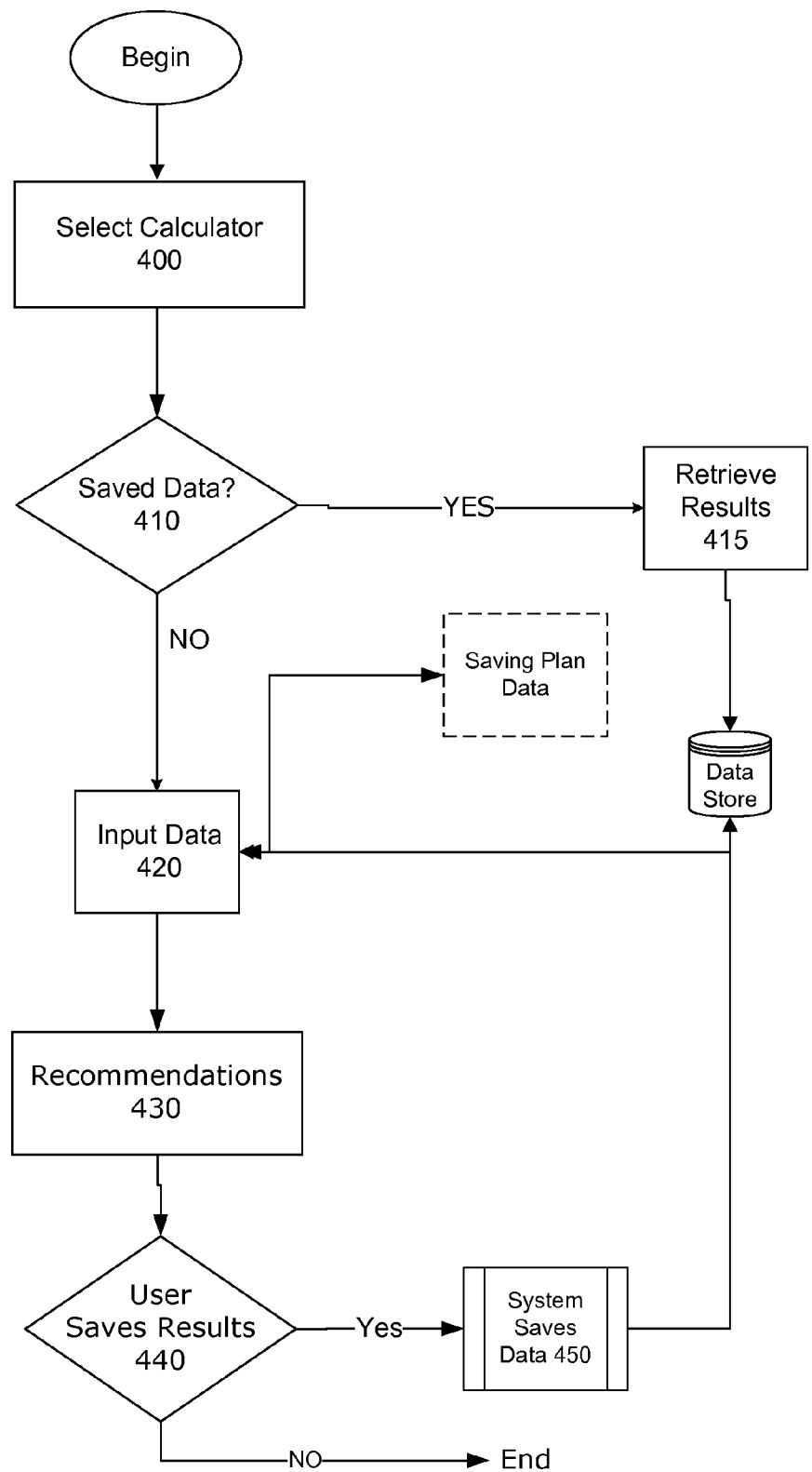
FIG. 4 illustrates an operational flow representing example operations related to providing a retirement savings calculator.

Referring now to FIG. 4, in one embodiment, the user initiates the retirement savings amount calculator by selecting the calculator 400 on a website provided by, for example, a financial institution. The user may be required to log in. The user may then begin a calculation. In certain embodiments the user may have data saved in the system's data store from a previous session. The process determines if the user has saved data 410. If the user has previously saved data, such data may be retrieved 415 and offered to the user as possible data inputs. The calculator may also request previously saved calculated results from the data store. The data entry fields may be pre-filled with the inputs saved from a recent session. The user may then have the option to keep or update the pre-filled inputs. Examples of such saved data may include but are not be limited to:
1. First name
2. First name: (Spouse)
3. Date of birth: (User)
4. Date of birth: (Spouse)
5. Are you currently employed?: (User)
6. Are you currently employed?: (Spouse)
7. Age to retire: (User)
8. Age to retire: (Spouse)
9. Life expectancy: (User)
10. Life expectancy: (Spouse)
11. Current retirement savings (User)
12. Current retirement savings (Spouse)
13. Estimated yearly pension in retirement (User)
14. Estimated yearly pension in retirement (Spouse)
15. Is pension adjusted for inflation? (User)
16. Is pension adjusted for inflation? (Spouse)
17. Social Security Amount Expected: (User)
18. Social Security Amount Expected: (Spouse)
19. Total Annual Gross Income: (User)
20. Total Annual Gross Income: (Spouse)
21. Other income: (User)
22. Other income: (Spouse)
23. Rate of inflation: (User)
24. Rate of inflation: (Spouse)

25. Expected rate of return: (User)
26. Expected rate of return: (Spouse)
27. Expected replacement ratio: (User)
28. Expected replacement ratio: (Spouse)
29. Amount needed at Retirement in Future dollars
30. Monthly savings amount needed in today's dollars.
31. Estimated amount received yearly from user's investments
32. Estimated amount received monthly from user's investments.

Other data may not reside in the data store and may be requested for input by the user. Such data may include but not be limited to: amount already saved, pension income, and social security income.

If the process determines that the user does not have previously saved results, then the web page may ask for user inputs 420. Once the user selects an option to determine a recommendation, the process may validate that the requested fields have been provided. If any requested data is missing or invalid, the process may notify the user and may request that the user provide or correct the data. The process may then determine a recommendation according to rules-based transactions and formulas, and may present recommendations 430 to the user. For example, the calculator may provide the total amount needed at retirement in future currency values. Alternatively, the calculator may provide the monthly savings amount needed in terms of present value. In further embodiments, the estimated amount received yearly and/or monthly from the user's investments may also be provided.

The retirement savings amount calculator may provide additional helpful information to the user to further understand the results, as well as provide suggestions for next steps. For example, the system may presents contact information for questions, links to other available online planning calculators, links to account application pages on the website, or inputs and assumptions used in the calculations.

The retirement savings amount calculator may further provide options to edit the inputs in order to calculate a new result. The system may also enable the user to select an option to save the results for future reference. When the results are saved, both the final calculations presented to the user and the data input by the user may be saved in a data store for future reference. The period of time that the data is saved may be predetermined by the service provider. Additionally and optionally, the user may choose an option to print the results. Finally, the user may elect to exit the retirement savings amount calculator process.

In another embodiment, a retirement savings accounts calculator may further provide recommendations on what type of account the user should use for retirement savings. Such a calculator may provide recommendations for the order in which the user should invest (i.e., 401K first, then Roth IRA, followed by either Annuities or Mutual Funds). For example, for a user whose employer contributes a matching amount of money based on the user's own contributions, the following path may be recommended:

1. Contribute $XXX to your employer's plan to receive a match.
2. Then contribute $XXX to a Roth IRA if eligible.
3. Then contribute up to the maximum to your employer's plan.
4. Then contribute to a mutual fund (or annuity if in a high marginal tax bracket and need further sheltering).

Similar to the retirement savings amount calculator above, the system may present the following items along with the recommendation:

1. Contact information for further information.
2. Links to other available online planning calculators.
3. Links to account application pages.
4. The inputs used in the calculations.
5. The option to edit the inputs to receive a new result.
6. The option to begin a new calculation.

Returning to FIG. 4, after the recommendations are provided, the user may select an option to print the results, save the results 440, or exits the calculator process. The process may then save the data 450 in the data store for future reference and retrieval. As described above, the results and user inputs may be saved in the data store for a predetermined period.

The inputs to determine the retirement savings accounts recommendation are similar to those of the retirement savings amount calculator:

1. Tax Filing Status (married, single, etc.)
2. Name: User
3. Spouse Name
4. Date of Birth
5. Spouse Date of Birth
6. Type of Employer Plan
7. Spouse Type of Employer Plan
8. Percentage of Employer Match
9. Spouse Percentage of Employer Match
10. Total Gross Earned Income
11. Spouse Total Gross Earned Income
12. Tax Year to Contribute To
13. Employer Plan Contribution
14. Roth IRA Contribution
15. Employer Plan Maximum Contribution
16. Calculator Name or Identifier
17. User Name or Identifier FIG. 6 depicts an example web page implementing some of the methods and systems described above. Referring to the figure, area 610 provides a recommended amount to save per month to meet the goals provided by the user.

Integrated Calculators

Figure 7:
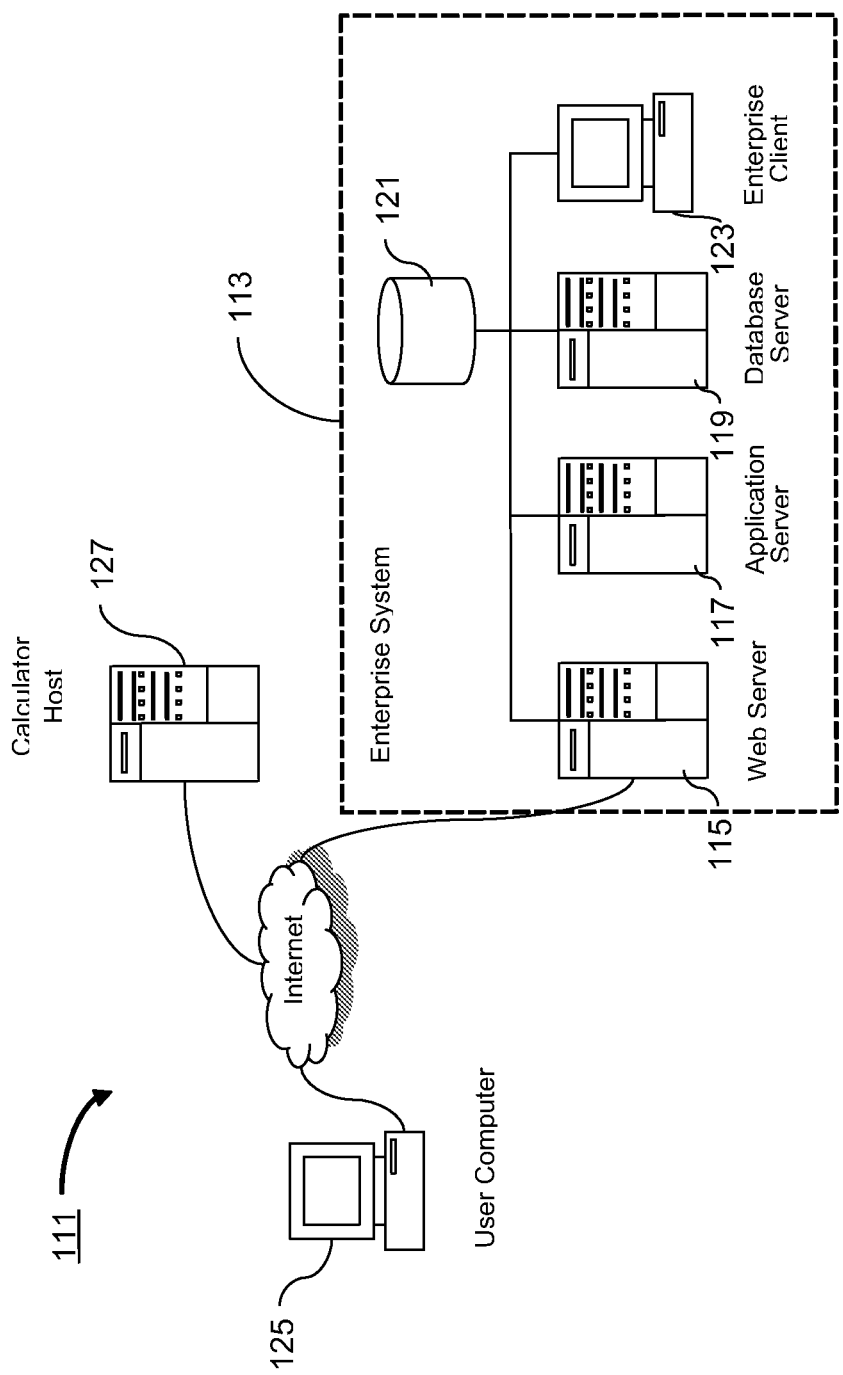
FIG. 7 illustrates the general environment in which the systems and methods of sharing data from web accessed calculators are implemented.

Illustrated in FIG. 7 is a typical environment in which the systems and methods for sharing data from web accessed calculators may be implemented. The general system 111 is a client/server system implemented through the Internet. An enterprise system 113 is provided which may include a web server 115, an application server 117, and a database server 119 with an associated data store 121. Also included in the enterprise system may be a plurality of enterprise client computers 123, such as computers operated by customer service representatives. It should be noted that the enterprise system 113 may comprise a plurality of web servers 115, application servers 117 and database servers 119, or all may be combined in a single computer device that provides the various functionalities of those servers. Access to the web server 115 is provided to a plurality of user computers 125 through the Internet. As explained in more detail herein, the web server 115 may provide web pages that include a calculator application, or may provide the user computer 125 with access to a separate calculator host 127 that provides a calculator application.

Figure 8:
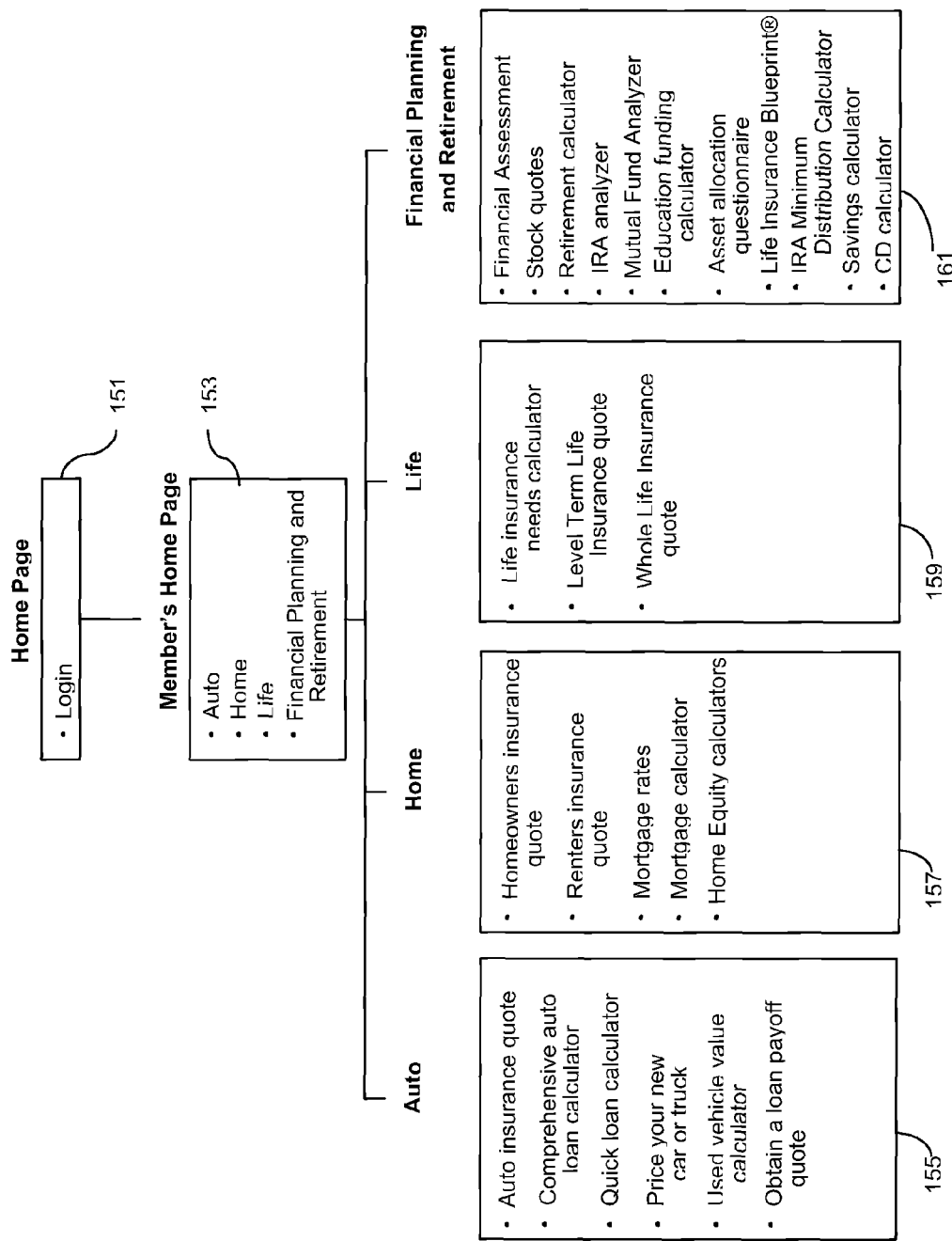
FIG. 8 illustrates a schematic of a web site layout including a plurality of calculators for different service offerings.

Illustrated in FIG. 8 is an example of the web site architecture that may provide access to a plurality of calculators. The typical arrangement includes an institution home page 151 that may provide a login functionality to the user, requiring a user name and password, and optionally a personal identification number to provide access to a user's home page 153. The user's home page 153 may provide information and hyperlinks to other pages offering services to the user. For example, in the illustration in FIG. 8, an example of a user's home page for a financial services website is represented. The user's home page may include information about services relating to auto, home, life and financial planning and retirement. More information about each of those services would be included in a web page hyperlinked to the user's home page. For example auto related services may be provided in a web page 155 that may include information about the automobile related services provided and a plurality of calculators, indicated in FIG. 8 as "auto insurance quote," "comprehensive auto loan calculator," "quick loan calculator" "price your new car or truck," "used vehicle value calculator," and "obtain a loan payoff quote." Each of those references is a hyperlink to a tool or calculator embedded in a web page that can be accessed by the user by clicking on a hyperlink. Similarly calculators are illustrated for the home services web page 157, life services web page 159, and a financial planning and retirement web page 161. The calculators or tools referenced in FIG. 8 vary from the very simple to the complex. However, all tools or calculators would require input from the user, which would be processed and presented as an output to the user.

Figure 9:
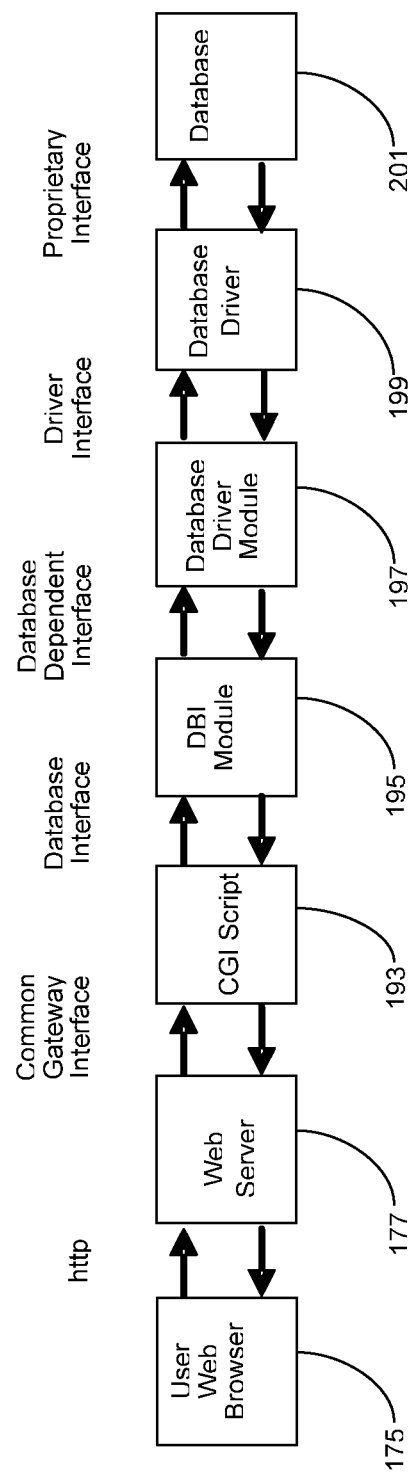
FIG. 9 is a flow chart illustrating a methodology for sharing and managing data created on a web page calculator.

Illustrated in FIG. 9 is a flow chart showing how data values that are provided by the user or calculated by a calculator may be captured and stored in a database. Data values are transmitted by the user's web browser 175 to the web server 177, in response to instructions in the web document. The transmission of the data is performed using HTTP. The web server then provides the data to an application that may include a Common Gateway Interface (CGI) Script 193. CGI is a standard protocol for interfacing external application software with a web server. CGI allows the server to pass requests from the user's web browser 175 to an external application and from the external application to the user's web browser 175. Alternatively, other technologies such as mod_perl or ASP, that integrate script interpreters directly into web servers as modules, may be used. Output from the CGI script 193 may be provided to a database interface (DBI) module 195. The DBI module 195 serves as an abstraction layer that allows programmers to use substantially platform-independent structured query language (SQL) code in their applications. Information from the DBI module may be processed by a database driver module 197, which in turn supplies a database driver 199 to provide the data to a database 201.

Although the more detailed examples provided above relate to financial services, it should be apparent to one of ordinary skill in the art that the systems and methods described herein will find application to other services that utilize calculators that share common data items. Additionally, although references have been made to a limited number of data items that may be applied in a financial services organization, the systems and methods of the present disclosure may be applied in connection with a wide variety of data items relating to financial services.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The various systems, methods, and techniques described herein may be implemented with hardware or software or, where appropriate, with a combination of both. Thus, the methods and apparatus of the present disclosure, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and may be combined with hardware implementations.

The methods of the present disclosure may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the disclosure. When implemented on a general-purpose processor, the program code combines with the processor to provide a unique apparatus that operates to perform the functionality of the systems and methods described herein.

While the present disclosure has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application-specific hardware/software interface systems, are herein contemplated, especially as the types and volume of wireless networked devices continues to proliferate. Therefore, the present invention should not be limited to any single embodiment, but rather should be construed in breadth and scope in accordance with the appended claims.

What is claimed is:

1. A college education financial planning system, comprising:
   a memory;
   a processor disposed in communication with said memory, and configured to issue a plurality of processing instructions stored in the memory, wherein the processor issues instructions to:
      configure a common data store comprising: personalized information associated with a plurality of users and accessible to a plurality of financial calculators provided by a financial institution selectable by a user, further comprising individualized cost data associated with a plurality of college level institutions;
      present, to the user, a web page that includes links to at least one of auto, home, life and financial planning services web pages, wherein the web pages have the plurality of financial calculators that each access the common data store;
      receive a request from said user via said financial planning services web page selecting a college savings calculator from the plurality of financial calculators that each access the common data store for their financial calculations;

identify at least one input data element required by said college savings calculator, wherein said at least one input data element comprises at least one of said college level institutions;

search said data store for previously stored individualized college education cost data associated with said user and related to said at least one identified input data element;

populate the at least one identified input data element in the college savings calculator with the searched previously stored individualized college education cost data associated with said user and said at least one of said college level institutions, wherein the individualized cost data is previously estimated by the college savings calculator based on user entered personal information and institution-based cost information; and send the requested financial planning services web page with the at least one identified populated input data element and said previously stored individualized college education cost data to the user.

2. The system of claim 1, wherein the processor issues further instructions to receive new data values from the user, store the new data values received from the user, receive new values for the at least one input data element, and receive new values for output data elements from the college savings calculator.

3. The system of claim 2, wherein the processor issues further instructions to receive at least one of: a student's first and last name, a student's age, age a student will start college, number of years a student will attend college, or annual cost.

4. The system of claim 3 wherein said data store is configured to store at least one of: a user number, student name, student age, age to start college, estimated annual cost, number of years attending college, amount already saved, monthly contribution, expected rate of return percentage, institution, estimated shortfall amount, percentage of total cost currently planned, or recommended monthly amount to save.

5. The system of claim 4, wherein the processor issues further instructions to receive estimated expenses for at least one of: geographic location, institution name, institution type, base tuition, books and supplies, room and board, in-state cost vs. out-of-state cost, on-campus cost vs. off-campus cost, miscellaneous expenses, total expenses, amount already saved per student, monthly contribution the user is currently making or would like to make, or rate of return percentage the user is expecting to receive.

6. The system of claim 5, wherein the processor issues further instructions to determine at least one of: estimated future cost of education, estimated shortfall amount, recommended monthly amount to save, or inputs and assumptions used in calculating results.

7. The system of claim 6, wherein the processor issues further instructions to provide at least one of: an option to edit a current recommendation, an option to begin a new recommendation, an option to save the current recommendation, or an option to print the current recommendation.

8. The system of claim 1, wherein the processor issues further instructions to:

display a web page showing a graphical representation of a projected savings amount of the user and a goal amount;

receive on the web page, from the user, an input related to a monthly contribution towards the projected savings amount, wherein the input is adjustable on a sliding scale by the user; and display on the web page, an adjusted projected savings amount using the user input related to the monthly contribution.

9. The system of claim 1, wherein the processor issues further instructions to:

identify a second input data element optional in the college savings calculator, wherein the second input data element relates to data associated with the user generated by another calculator of the plurality of financial calculators;

search the common data store, shared by the plurality of financial calculators, for previously stored data associated with the user generated by the another calculator;

populate the second input data element in the college savings calculator with the previously stored data associated with the user generated by the another calculator; and provide, to the user, the college savings calculator populated with the previously stored data associated with the user.

10. A processor-implemented college education financial planning method, comprising:

providing a common data store comprising personalized information associated with a plurality of users and accessible to a plurality of financial calculators provided by a financial institution selectable by a user, further comprising individualized cost data associated with a plurality of college level institutions;

presenting to the user a web page that includes links to at least one of auto, home, life and financial planning services web pages, wherein the web pages have the plurality of financial calculators that each access the common data store;

receiving a request from said user via said financial planning services web page selecting a college savings calculator from the plurality of financial calculators that each access the common data store for their financial calculations;

identifying at least one input data element required by said college savings calculator, wherein said at least one input data element comprises at least one of said college level institutions;

searching, via a processor, said data store for previously stored individualized college education cost data associated with said user and related to said at least one identified input data element;

populating the at least one identified input data element in the college savings calculator with the searched previously stored individualized college education cost data associated with said user and said at least one of said college level institutions, wherein the individualized cost data is previously estimated by the college savings calculator based on user entered personal information and institution-based cost information; and sending the requested financial planning services web page with the at least one identified populated input data element and said previously stored individualized college education cost data to the user.

11. The method of claim 10, further comprising receiving new data values from the user, storing the new data values received from the user, receiving new values for the at least one input data element, and receiving new values for output data elements from the college savings calculator.

12. The method of claim 11, further comprising receiving at least one of: a student's first and last name, a student's age, age a student will start college, number of years a student will attend college, or annual cost.

13. The method of claim 12 wherein said data store is configured to store at least one of: a user number, student name, student age, age to start college, estimated annual cost, number of years attending college, amount already saved, monthly contribution, expected rate of return percentage, institution, estimated shortfall amount, percentage of total cost currently planned, or recommended monthly amount to save.

14. The method of claim 13, further comprising receiving estimated expenses for at least one of: geographic location, institution name, institution type, base tuition, books and supplies, room and board, in-state cost vs. out-of-state cost, on-campus cost vs. off-campus cost, miscellaneous expenses, total expenses, amount already saved per student, monthly contribution the user is currently making or would like to make, or rate of return percentage the user is expecting to receive.

15. The method of claim 14, further comprising determining at least one of: estimated future cost of education, estimated shortfall amount, recommended monthly amount to save, or inputs and assumptions used in calculating results.

16. The method of claim 15, further comprising providing at least one of: an option to edit a current recommendation, an option to begin a new recommendation, an option to save the current recommendation, or an option to print the current recommendation.

17. A computer readable non-transitory medium bearing processor-executable instructions, the processor-executable instructions executed by a processor to:
configure a common data store comprising personalized information associated with a plurality of users and accessible to a plurality of financial calculators provided by a financial institution selectable by a user, further comprising individualized cost data associated with a plurality of college level institutions;
present, to the user a web page that includes links to at least one of auto, home, life and financial planning services web pages, wherein the web pages have the plurality of financial calculators that each access the common data store;
receive a request from said user via said financial planning services web page selecting a college savings calculator from the plurality of financial calculators that each access the common data store for their financial calculations;
identify at least one input data element required by said college savings calculator, wherein said at least one input data element comprises at least one of said college level institutions;
search said data store for previously stored individualized college education cost data associated with said user and related to said at least one identified input data element;
populate the at least one identified input data element in the college savings calculator with the searched previously stored individualized cost data associated with said user and said at least one of said college level institutions, wherein the individualized cost data is previously estimated by the college savings calculator based on user entered personal information and institution-based cost information; and
send the requested financial planning services web page with the at least one identified populated input data element and said previously stored individualized college education cost data to the user.

18. The computer readable non-transitory medium of claim 17, wherein the processor-executable instructions are further executed by the processor to receive new data values from the user, storing the new data values received from the user, receiving new values for the input data elements, and receiving new values for the output data elements from the calculator.

19. The computer readable non-transitory medium of claim 18, wherein the processor-executable instructions are further executed by the processor to receive at least one of: a student's first and last name, a student's age, age a student will start college, number of years a student will attend college, or annual cost.

20. The computer readable non-transitory medium of claim 19 wherein said data store is configured to store at least one of: a user number, student name, student age, age to start college, estimated annual cost, number of years attending college, amount already saved, monthly contribution, expected rate of return percentage, institution, estimated shortfall amount, percentage of total cost currently planned, or recommended monthly amount to save.

21. The computer readable non-transitory medium of claim 20, wherein the processor-executable instructions are further executed by the processor to receive estimated expenses for at least one of: geographic location, institution name, institution type, base tuition, books and supplies, room and board, in-state cost vs. out-of-state cost, on-campus cost vs. off-campus cost, miscellaneous expenses, total expenses, amount already saved per student, monthly contribution the user is currently making or would like to make, or rate of return percentage the user is expecting to receive.

* * * * *